US008942087B2

(12) United States Patent
Xue et al.

(10) Patent No.: US 8,942,087 B2
(45) Date of Patent: *Jan. 27, 2015

(54) METHODS AND APPARATUS FOR CONTROLLING WIRELESS NETWORK RESOURCES FOR DATA SESSIONS BASED ON IP ADDRESS USAGE

(75) Inventors: Hao Xue, Ottawa (CA); Muhammad Khaledul Islam, Kanata (CA)

(73) Assignee: BlackBerry Limited, Waterloo (CA)

( * ) Notice: Subject to any disclaimer, the term of this patent is extended or adjusted under 35 U.S.C. 154(b) by 793 days.

This patent is subject to a terminal disclaimer.

(21) Appl. No.: 12/824,940

(22) Filed: Jun. 28, 2010

(65) Prior Publication Data

US 2010/0265908 A1    Oct. 21, 2010

Related U.S. Application Data

(63) Continuation of application No. 10/883,313, filed on Jun. 30, 2004, now Pat. No. 7,746,774.

(51) Int. Cl.
*H04W 72/04* (2009.01)
*H04W 8/26* (2009.01)
*H04L 29/12* (2006.01)
*H04L 29/06* (2006.01)
(Continued)

(52) U.S. Cl.
CPC ............ *H04W 8/26* (2013.01); *H04L 29/12273* (2013.01); *H04L 61/2053* (2013.01); *H04L 69/16* (2013.01); *H04L 67/14* (2013.01); *H04L 69/168* (2013.01); *H04W 80/04* (2013.01); *H04W 80/10* (2013.01)
USPC ............ 370/230; 370/252; 370/310; 370/351

(58) Field of Classification Search
USPC ............ 370/230, 252, 310.351; 709/228, 230
See application file for complete search history.

(56) References Cited

U.S. PATENT DOCUMENTS 6,546,247 B1 * 4/2003 Foti et al. ...................... 455/433
6,810,263 B1   10/2004 Cheng et al.
(Continued)

FOREIGN PATENT DOCUMENTS

WO         0120930 A1    3/2001
WO        03096730 A1   11/2003
WO      2004014035 A1    2/2004

OTHER PUBLICATIONS

European Search Report & Written Opinion for EP Patent Application # 04253940.3, Filed Dec. 1, 2004.

*Primary Examiner* — Yemane Mesfin
*Assistant Examiner* — Henry Baron
(74) *Attorney, Agent, or Firm* — Moffat & Co.

(57) ABSTRACT

One illustrative method of for use in controlling network resources in a wireless network involves assigning, from a pool of IP addresses, a temporary IP address for a mobile station in the wireless network; calculating a ratio or percentage of the number of IP addresses and the total number of IP addresses in the pool; setting a timer value for the mobile station to an initial value that depends on the ratio or percentage of IP addresses such that, as the ratio or percentage increases, the initial value decreases; causing the temporary IP address and the timer value to be sent to the mobile station, which is adapted to register the temporary IP address with a home agent for IP mobility service; and communicating a termination request which terminates the IP mobility service if no request for re-registration is received from the mobile station upon expiration of the timer value.

17 Claims, 6 Drawing Sheets

(51) Int. Cl.
*H04L 29/08* (2006.01)
*H04W 80/04* (2009.01)
*H04W 80/10* (2009.01)

(56) References Cited

U.S. PATENT DOCUMENTS

| | | | |
|---|---|---|---|
| 6,988,148 B1* | 1/2006 | Sheth | 709/245 |
| 7,152,238 B1 | 12/2006 | Leung et al. | |
| 7,187,682 B2* | 3/2007 | Soulhi et al. | 370/401 |
| 2002/0054596 A1 | 5/2002 | Sengodan | |
| 2002/0138614 A1* | 9/2002 | Hall | 709/225 |
| 2003/0012222 A1 | 1/2003 | Rinchiuso | |
| 2003/0058813 A1 | 3/2003 | Viola et al. | |
| 2003/0156537 A1 | 8/2003 | Soulhi et al. | |
| 2003/0163584 A1 | 8/2003 | Anderson et al. | |
| 2003/0189951 A1 | 10/2003 | Bi et al. | |
| 2003/0193952 A1 | 10/2003 | O'Neill | |
| 2004/0148427 A1 | 7/2004 | Nakhjiri et al. | |
| 2005/0021770 A1 | 1/2005 | Helm et al. | |
| 2005/0083969 A1 | 4/2005 | Lee et al. | |
| 2010/0191723 A1* | 7/2010 | Perez et al. | 707/723 |

* cited by examiner

FIG. 1
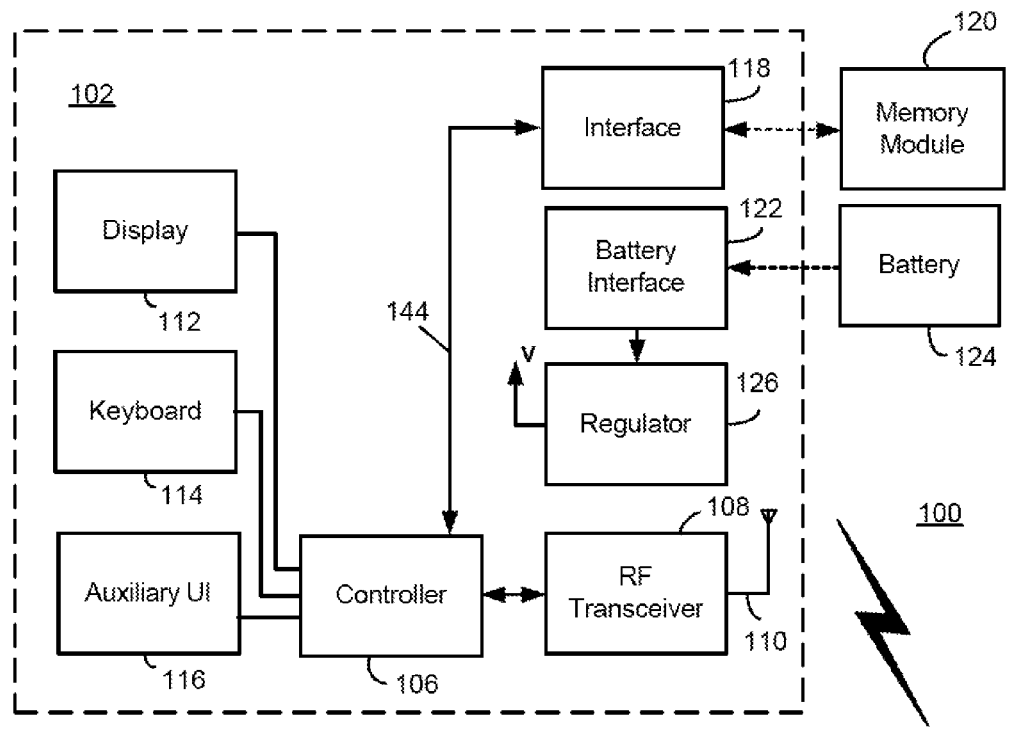
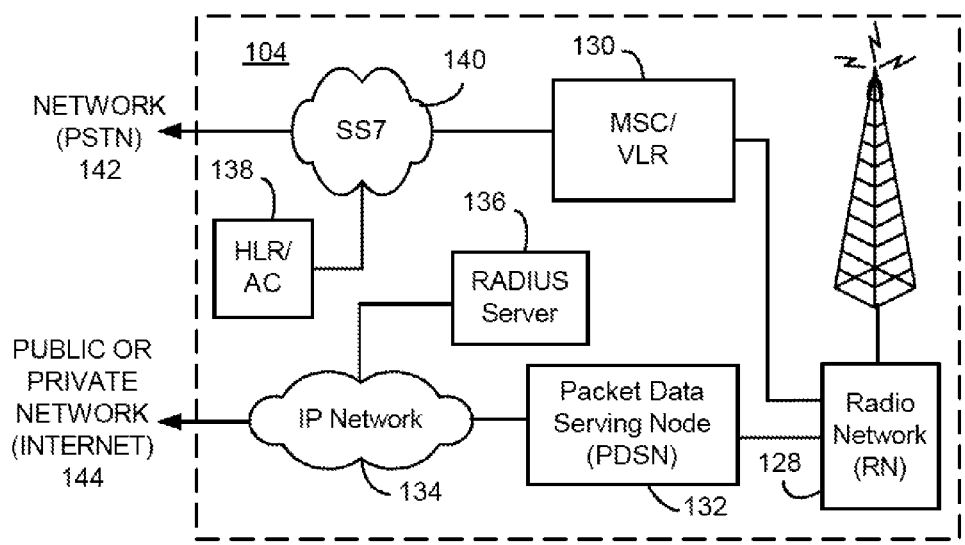

METHODS AND APPARATUS FOR CONTROLLING WIRELESS NETWORK RESOURCES FOR DATA SESSIONS BASED ON IP ADDRESS USAGE

CROSS-REFERENCE TO RELATED APPLICATION

The present application is a continuation of and claims priority to U.S. non-provisional patent application having application Ser. No. 10/883,313 and filing date of 30 Jun. 2004, which is hereby incorporated by reference herein.

BACKGROUND

1. Field of the Technology

The present application relates generally to wireless communication networks for mobile stations, and more particularly to methods and apparatus for controlling wireless network resources for data sessions based on IP address usage.

2. Description of the Related Art

A wireless communication device, such as a mobile station operating in a wireless communication network, may provide for both voice telephony and packet data communications. A mobile station may, for example, be compatible with $3^{rd}$ Generation (3G) communication standards (such as cdma2000™) and utilize Global System for Mobile Communications (GSM), Time Division Multiple Access (TDMA), or Code Division Multiple Access (CDMA) wireless network technologies.

In a cdma2000™ based wireless network, a mobile station sends and receives packet data during a Point-to-Point Protocol (PPP) session established with a Packet Data Serving Node (PDSN). The packet data could be e-mail, web browser, news and weather data, as a few examples. When an idle mobile station has packet data to send, it initiates a new PPP session with the PDSN. The mobile station may also be directed by the network to initiate a PPP session when the network has data to send. During initialization of the PPP session, an IP address from a pool of IP addresses managed by the network is dynamically assigned to the mobile station. This assignment may be performed by the PDSN during an Internet Protocol Control Protocol (IPCP) stage in a Simple IP network as defined in IS-835. In a Mobile IP network, the network assigns an IP address as part of Mobile IP registration.

Once PPP connectivity is established between the mobile station and the network, it is generally maintained even when no data is being communicated. The packet data service at the mobile station and network is assumed to have entered "dormant" state in such case. To reduce latency in exchanging application level data (e.g. to ensure quick data availability for an always-on mobile station), it is desirable for the PPP session to be maintained continuously even during periods of communication inactivity. The PPP session may be closed by the PDSN, however, when there is communication inactivity for some relatively long period of time and the mobile station is unavailable.

For this purpose, the PDSN maintains a data inactivity timer for each mobile station involved in a PPP session. The exact behavior depends on whether the network and the mobile station have a Simple IP connection or a Mobile IP connection. In a Simple IP network, this timer may be passed to the mobile station in the form of maximum PPP inactivity timer. This data inactivity timer is set to an initial value (e.g. 2 hours) and is reset for each occurrence of communication activity. If no packet data is sent or received for the mobile station over the time period defined by the data inactivity timer, the PDSN sends a Link Control Protocol (LCP) Echo-Request message to the mobile station. If there is no response to the LCP Echo-Request from the mobile station within the time period defined by data inactivity timer, the PDSN closes the PPP session. The PDSN closes the PPP session as it infers that the mobile station is no longer available for communication. In a Mobile IP network, the network can specify a Registration lifetime for a Mobile IP connection. If the mobile station does not re-register within the network specified lifetime, the PDSN closes the PPP session.

The above-described procedure is useful since it helps release network resources to make them available to newly-arriving mobile stations. For example, the pool of IP addresses is finite and limited—if the entire pool of IP addresses are assigned, the PDSN does not have any available IP addresses to assign to newly-arriving mobile stations. In addition, the network also maintains information about the binding of the IP address to a mobile station, which requires memory.

A problem arises, however, in the selection of a suitable initial value for the data inactivity timer. If network operation is very busy (i.e. there is a relatively large number of always-on mobile stations operating in the wireless network), a data inactivity timer with a relatively large initial value will not provide for the expeditious release of network resources for newly-arriving mobile stations. If network operation is very slow (i.e. there is a relatively small number of always-on mobile stations operating in the wireless network), a data inactivity timer with a relatively small initial value will result in numerous unnecessary attempts to release network resources and a resulting inefficient use of bandwidth. In addition, the data inactivity timer may also be selected by the network based on the quality of service (QoS) subscribed to.

Accordingly, what are needed are methods and apparatus for controlling wireless network resources for data sessions so as to overcome the deficiencies in the prior art.

BRIEF DESCRIPTION OF THE DRAWINGS

Embodiments of present application will now be described by way of example with reference to attached figures, wherein:

FIG. 1 is a block diagram which illustrates pertinent components of a mobile station and a wireless communication network;

DETAILED DESCRIPTION OF THE PREFERRED EMBODIMENTS

Figure 2:
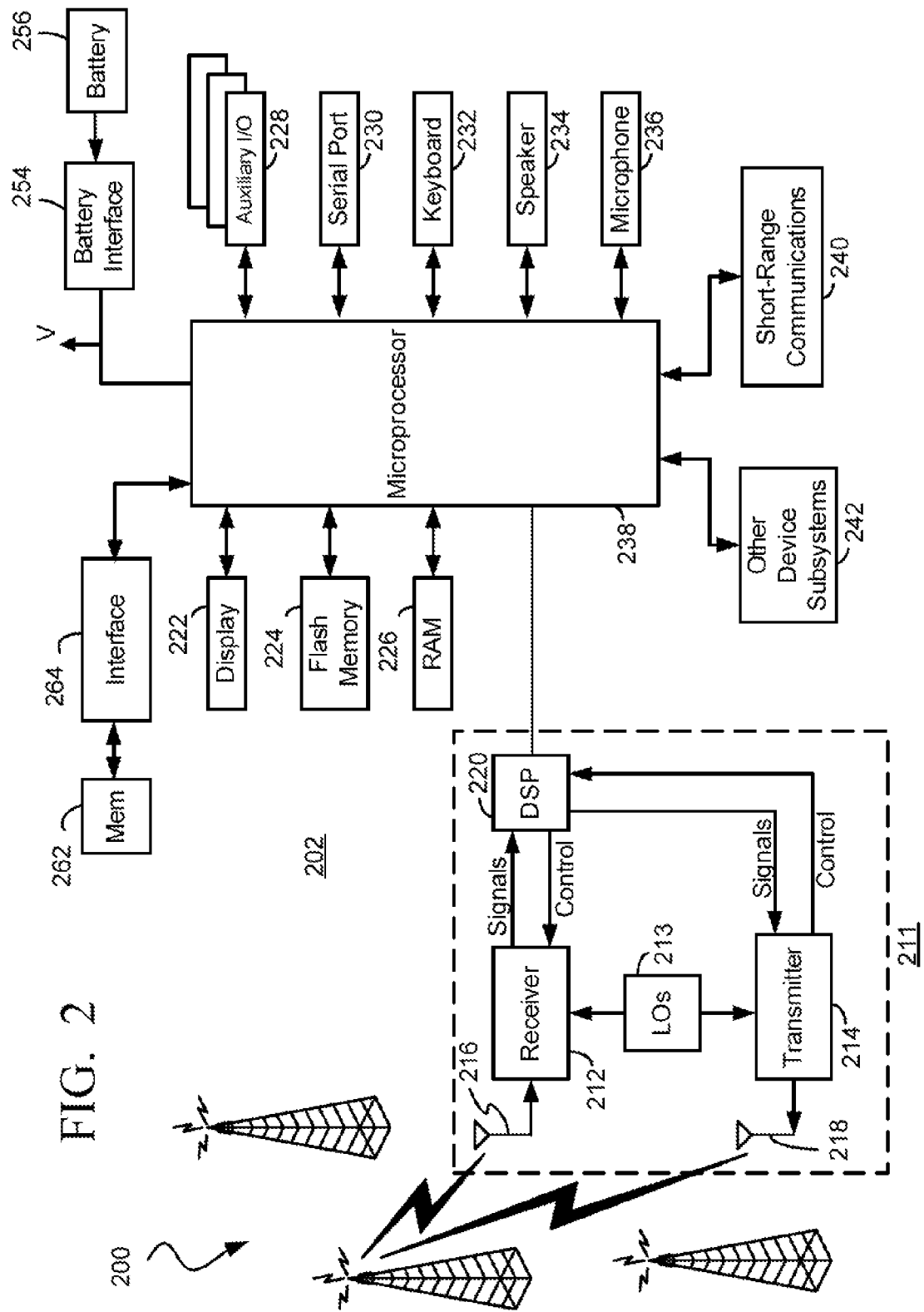
FIG. 2 is a more detailed diagram of a preferred mobile station of FIG. 1.

Methods and apparatus for controlling wireless network resources for data sessions based on IP address usage are described herein. One illustrative method involves identifying IP address usage for mobile stations which operate in a wireless communication network and causing a data inactivity timer of a data session for a mobile station to be set to an initial value that depends on the IP address usage. The data inactivity timer is set to a relatively large value when the IP address usage is low, but to a relatively small value when the IP address usage is high in order to expeditiously release underutilized network resources. If the IP address usage changes, the data inactivity timer is dynamically updated. The data session may be a Point-to-Point Protocol (PPP) session for which an IP address is dynamically-assigned to the mobile station.

FIG. 1 is a block diagram of a communication system 100, which includes a mobile station 102, which communicates through a wireless communication network 104. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110. Typically, controller 106 is embodied as a central processing unit (CPU), which runs operating system software in a memory component (not shown). Controller 106 will normally control overall operation of mobile station 102, whereas signal-processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. It will be apparent to those skilled in art that RF transceiver circuitry 108 will be adapted to particular wireless network or networks in which mobile station 102 is intended to operate.

Mobile station 102 includes a battery interface 122 for receiving one or more rechargeable batteries 124. Battery 124 provides electrical power to electrical circuitry in mobile station 102, and battery interface 122 provides for a mechanical and electrical connection for battery 124. Battery interface 122 is coupled to a regulator 126 which regulates power to the device, providing an output having a regulated voltage V. Mobile station 102 also operates using a memory module 120, such as a Subscriber Identity Module (SIM) or a Removable User Identity Module (R-UIM), which is connected to or inserted in mobile station 102 at an interface 118.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication network 104. In the embodiment of FIG. 1, wireless network 104 is a Third Generation (3G) supported network based on Code Division Multiple Access (CDMA) technologies. In particular, wireless network 104 is a cdma2000™ network which includes fixed network components coupled as shown in FIG. 1. Cdma2000™ is a trademark of the Telecommunications Industry Association (TIA). Wireless network 104 of the cdma2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN), whereas IP network is communicatively coupled to a network 144 (such as the Internet).

During operation, mobile station 102 communicates with RN 128, which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from mobile stations within its cell. The base station transceiver system normally performs such functions as modulation and possibly encoding and/or encryption of signals to be transmitted to the mobile station in accordance with particular, usually predetermined, communication protocols and parameters, under control of its controller. The base station transceiver system similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in a HLR/AC 138. In case of a voice call to mobile station 102, HLR/AC 138 is queried to determine the current location of mobile station 102. A Visitor Location Register (VLR) of MSC 130 is responsible for a group of location areas and stores the data of those mobile stations that are currently in its area of responsibility. This includes parts of the permanent mobile station data that have been transmitted from HLR/AC 138 to the VLR for faster access. However, the VLR of MSC 130 may also assign and store local data, such as temporary identifications. HLR/AC 138 also authenticates mobile station 102 on system access.

In order to provide packet data services to mobile station 102 in a cdma2000-based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Those skilled in art will appreciate that wireless network 104 may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

FIG. 2 is a detailed block diagram of a preferred mobile station 202 utilized in the present application. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of base station transceiver systems 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Subscriber Identity Module or "SIM" card or a Removable User Identity Module (R-UIM), to be inserted in or connected to an interface 264 of mobile station 202 in order to operate in the network. Since mobile station 202 is a mobile battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. Battery interface 254 is coupled to a regulator (not shown) which regulates power to all of the circuitry, providing an output having a regulated voltage V.

Microprocessor 238, which is one implementation of controller 106 of FIG. 1, controls overall operation of mobile station 202. This control includes network selection techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications, which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component, which provides for communication between mobile station 202 and different systems or devices, which need not necessarily be similar devices. For example, subsystem 240 may include an infrared device and associated circuits and components, or a Bluetooth™ communication module to provide for communication with similarly enabled systems and devices. Bluetooth™ is a registered trademark of Bluetooth SIG, Inc.

Figure 3:
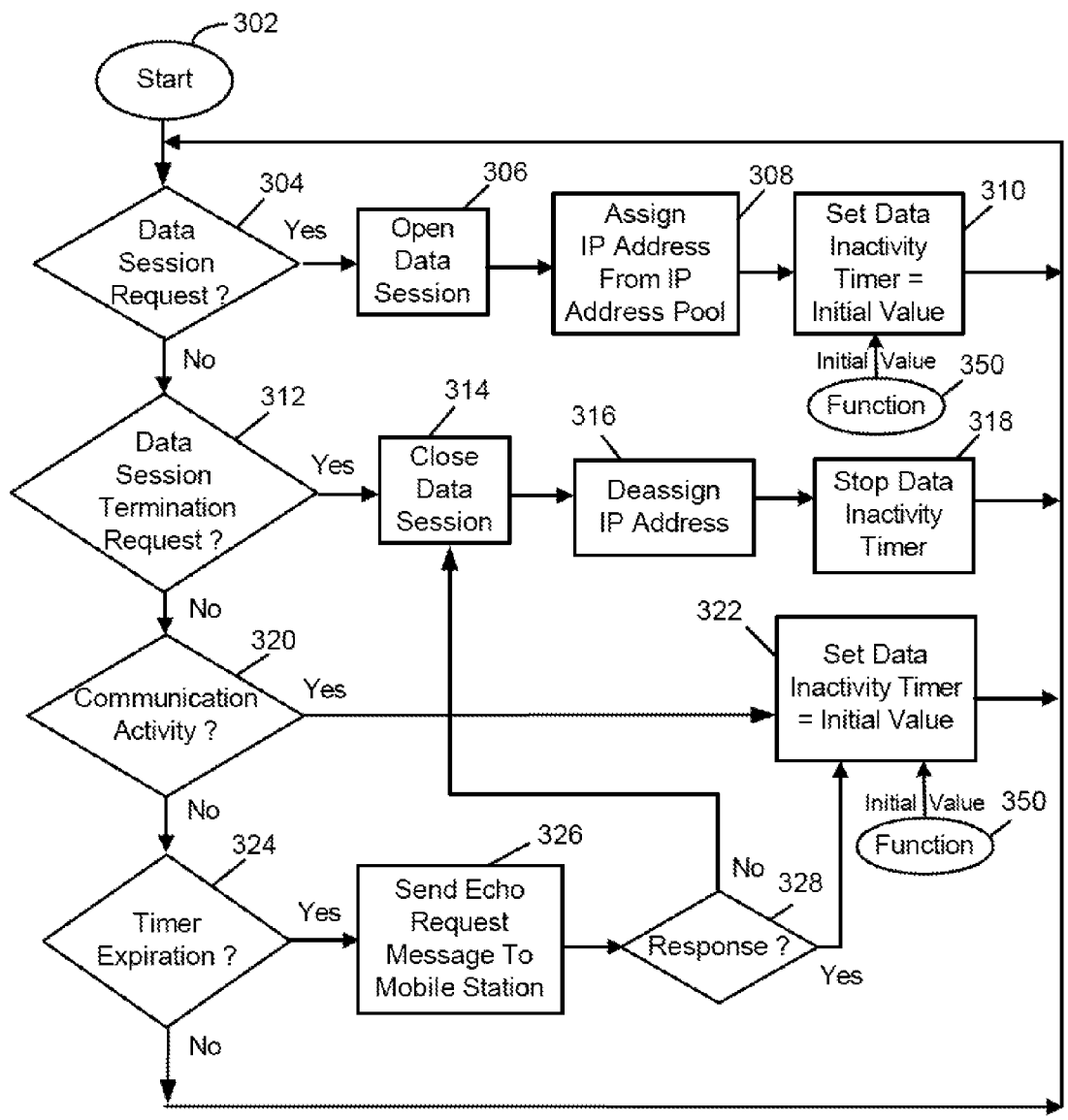
FIG. 3 is a flowchart for describing a method of controlling wireless network resources for data sessions, which includes a function described in relation to FIG. 4 for obtaining an initial value for a data inactivity timer based on IP address usage.
Figure 4:
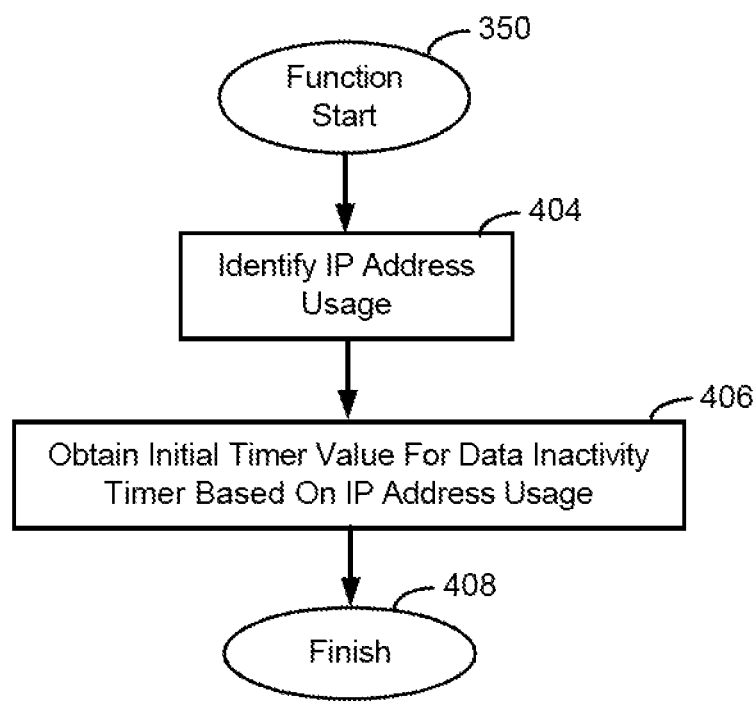
FIG. 4 is flowchart for describing a method of obtaining the initial value for the data inactivity timer based on the IP address usage, which is used in the flowchart of FIG. 3.

FIG. 3 is a flowchart for describing a method of controlling wireless network resources for data sessions based on IP address usage according to the present application. The method of FIG. 3 utilizes a further method described in relation to FIG. 4 to obtain a suitable initial value for a data inactivity timer of a data session. The logic described in relation to FIGS. 3-4 may be performed by a wireless network component, such as a Packet Data Serving Node (PDSN) (see e.g. FIG. 1) or one or more processors at the PDSN, in association with mobile stations (see e.g. FIGS. 1-2). However, any suitable wireless network component(s) may be utilized as alternatives. The wireless network component may include one or more processors, memory, computer instructions stored in the memory, where the computer instructions are executable by the one or more processors to perform the described method. A computer program product may include computer instructions stored on a storage medium (memory, a floppy disk or CD-ROM) which are written in accordance with the described logic. Note that, although the flowchart describes network operation in relation to a single mobile station, the method of FIGS. 3-4 is performed for a plurality of always-on mobile stations operating in the wireless network. Also, although the detailed description primarily relates to PPP sessions in a cdma2000™ wireless network, the present techniques may apply to any suitable data sessions in any suitable wireless network.

Beginning at a start block 302 of FIG. 3, the wireless network component identifies whether a new data session is being requested by a mobile station (step 304). If a new data session is being requested as identified in step 304, then the wireless network component causes a new data session to be opened for the mobile station (step 306). In doing this, an IP address is selected from a pool of IP addresses and dynamically assigned to the mobile station (step 308). The IP address selected is one that is available and assigned to no other mobile station in the wireless network. In addition, a data inactivity timer for the data session is set to its initial value and started (step 310). The initial value is determined by a function 350 which will be described later below. After step 310, the flowchart repeats starting again at step 304.

If no request for a new data session is made at step 304, the wireless network component identifies whether a data session termination request from the mobile station is received (step 312). If a data session termination request is received as identified in step 312, then the wireless network component causes the data session for the mobile station to be closed (step 314). In doing this, a previously assigned IP address of the mobile station is deassigned from the mobile station and returned to the pool of IP addresses managed by the wireless network (step 316). This IP address is thereby made available for assignment to other mobile stations in the wireless network. In addition, the data inactivity timer for the data session is stopped as the data session is closed (step 318). After step 318, the flowchart repeats starting again at step 304.

If no data session termination request is received at step 312, the wireless network component identifies whether any communication activity for the mobile station has occurred in the data session (step 320). If so, the data inactivity timer is reset to its initial value (step 322). This initial value is determined by function 350 as in step 310, which will be described later below. After step 322, the flowchart repeats starting again at step 304. If no communication activity for the mobile station occurred as identified in step 320, the wireless network component identifies whether the data inactivity timer of the data session for the mobile station has expired (step 324). If the data inactivity timer has not expired at step 324, then the flowchart repeats starting again at step 304.

If the data inactivity timer has expired at step 324, then the wireless network component causes a message to be sent to the mobile station (step 326). This message is intended to solicit a reply from the mobile station. The message may be, for example, a Link Control Protocol (LCP) message having an Echo-Request code (i.e. an Echo-Request message). Thereafter, the wireless network component identifies whether a reply message from the mobile station is received in response to the message (step 328). The reply message may be an LCP message having an Echo-Reply code (i.e. an Echo-Reply message). Typically, the wireless network component waits to receive an Echo-Reply message from the mobile station within a predetermined time period. If a reply message is received at step 328, then the data inactivity timer is reset to its initial value (step 322). Again, the initial value is determined by function 350 which will be described later below. If no response message is received at step 328, then the data session for the mobile station is closed (step 314), the previously assigned IP address of the mobile station is deassigned from the mobile station and returned to the pool of IP addresses managed by the wireless network (step 316), and the data inactivity timer for the data session is stopped (step 318). Note that the wireless network component may perform a plurality of retries when a reply message is not received from the mobile station, before it determines that the mobile station is unavailable. The flowchart repeats starting again at step 304.

As apparent, the data session will be closed when there is communication inactivity for a relatively long period of time and the mobile station is unavailable. It is for this purpose that the data inactivity timer is started and utilized in step 310, it being useful since it helps release network resources to make them available to newly-arriving mobile stations. A problem arises, however, in the selection of a suitable initial value for the data inactivity timer. If network operation is very busy (i.e. there is a relatively large number of always-on mobile stations operating in the wireless network), a data inactivity timer with a relatively large initial value will not provide for the expeditious release of network resources for newly-arriving mobile stations. If network operation is very slow (i.e. there is a relatively small number of always-on mobile stations operating in the wireless network), a data inactivity timer with a relatively small initial value will result in numerous unnecessary attempts to release network resources which is an inefficient use of bandwidth.

Advantageously, techniques of the present application help alleviate these concerns. Function 350 is utilized to obtain a suitable initial value for the data inactivity timer in steps 310 and 322 of FIG. 3; the initial value is variable and depends on the current IP address usage. This function 350 is described generally in relation to the flowchart of FIG. 4. Beginning at a function start block 350 of FIG. 4, IP address usage is identified for mobile stations operating in the wireless communication network (step 404). Next, an initial value that depends on the IP address usage is obtained for the data inactivity timer (step 406). Simply put, the initial value obtained in step 406 generally increases/decreases with increasing/decreasing availability of IP addresses. For example, the data inactivity timer may be set to a first initial value based on a first IP address usage or a second initial value based on a second IP address usage, where the second IP address usage is greater than the first IP address usage and the second initial value is less than the first initial value. The function ends at a finish block 408.

The IP address usage in step 404 may be identified in a number of different ways. For example, the IP address usage may be identified based on a ratio or percentage of a number of assigned (or unassigned) IP addresses to the total number of IP addresses available (e.g. 20%, 50%, or 80% availability). On the other hand, the IP address usage may be identified by the number of assigned (or unassigned) IP addresses (e.g. 1000, 2000, or 3000 IP addresses available) where the total number of IP addresses available is assumed or understood. The IP address usage may alternatively be identified based on other suitable network indications, such as a number of opened data sessions (e.g. PPP sessions) for mobile stations operating in the wireless network.

In step 406, a suitable initial value for the data inactivity timer is obtained based on the IP address usage previously identified in step 404. This initial value may be obtained in a number of different ways. For example, the initial value may be based on a continuous or discrete function of IP address usage. This function may be, for example, a simple linear function with a negative slope (e.g. x-axis=IP address usage, y-axis=initial value). However, any suitable function or characteristic may be utilized. In a more simplified case, the initial value is selected from only two or more possible values based on the IP address usage. In this case, if a ratio or percentage of IP address usage is utilized for the technique, this ratio or percentage may be compared to a predetermined threshold ratio or percentage value. If the ratio or percentage is within a limit defined by the predetermined threshold value, then a first initial value is obtained; otherwise if the ratio or percentage is outside the limit defined by the predetermined threshold value, then a second initial value is obtained. As another example, if a number of unassigned or assigned IP addresses is utilized for the technique, this number may be compared to a predetermined threshold number. If the number is within a limit defined by the predetermined threshold number, then a first initial value is obtained; otherwise if the number is outside the limit defined by he predetermined threshold number, then a second initial value is obtained.

Figure 5:
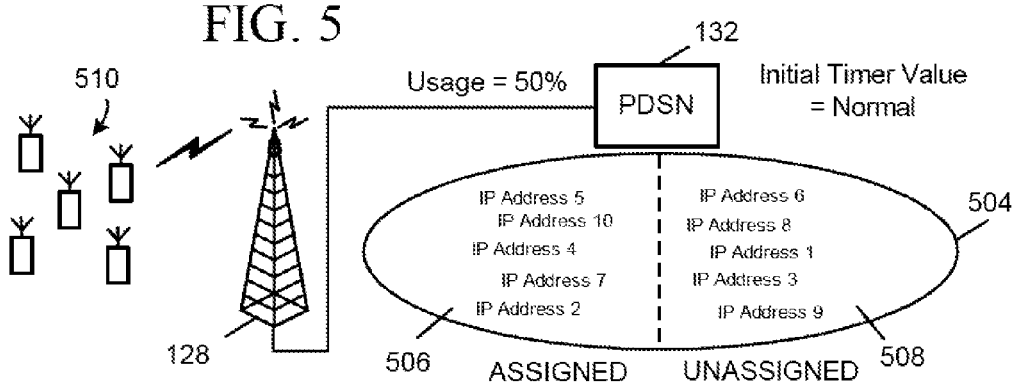
FIG. 5 is a depiction of the wireless communication network with normal IP address usage where an initial value for the data inactivity timer is normal.

FIG. 5 is a depiction of the wireless communication network with "normal" IP address usage which corresponds to an initial value that is "normal". In this illustrative example, a plurality of mobile stations 510 are operating in the wireless network. These mobile stations 510 are "always-on" devices which have data sessions established with the wireless network. PDSN 132 manages an IP address pool 504 having a total number of ten (10) IP addresses available. In actual practice, the total number of IP addresses available is much larger but a smaller number is utilized for clarity of the example. PDSN 132 facilitates the dynamic assignment of the IP addresses in IP address pool 504 for mobile stations utilizing a data session (e.g. PPP session). In the example shown in FIG. 5, five (5) mobile stations 510 are currently operating in the wireless network. Accordingly, five (5) IP addresses of IP address pool 504 are assigned to the five (5) mobile stations 510 as depicted in an "assigned" address pool portion 506. On the other hand, five (5) IP addresses of IP address pool 504 are not assigned to any mobile station as depicted in an "unassigned" address pool portion 508. Thus, the IP address usage in FIG. 5 based on the ratio of assigned IP addresses to the total number of available IP addresses is 50%. Since this is deemed to be normal traffic, the initial value obtained is relatively normal and ordinary (e.g. 2 hours).

Figure 6:
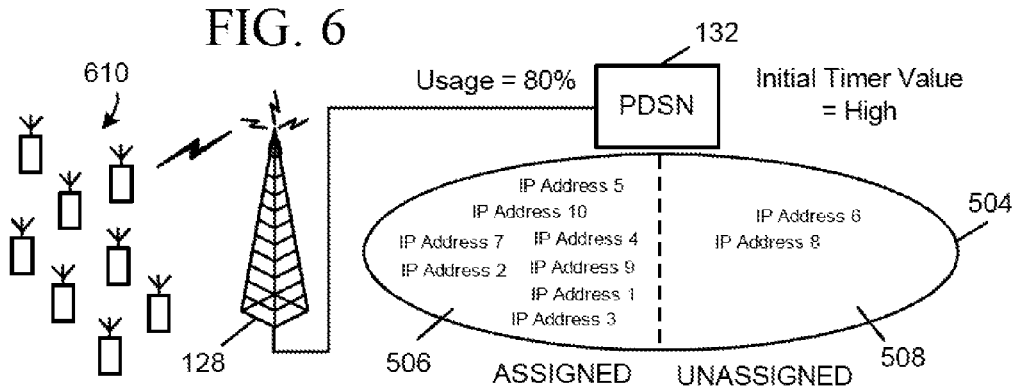
FIG. 6 is a depiction of the wireless communication network with high IP address usage where the initial value for the data inactivity timer is relatively small.
Figure 7:
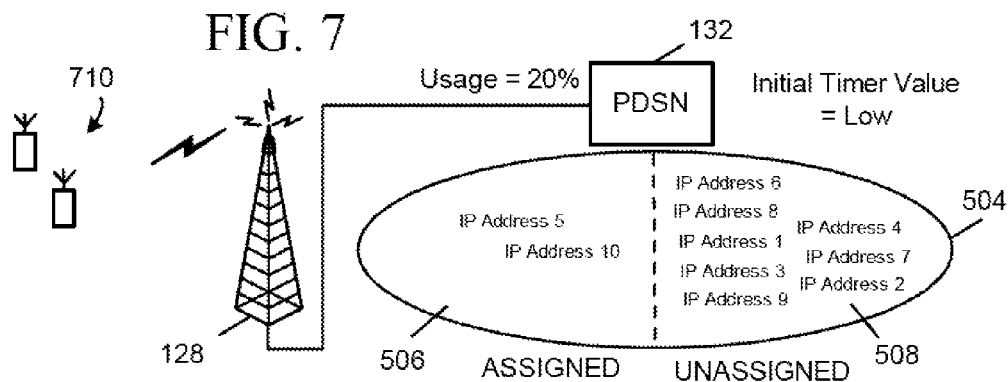
FIG. 7 is a depiction of the wireless communication network with low IP address usage where the initial value for the data inactivity timer is relatively large.

FIGS. 6 and 7 are depictions of the same wireless network of FIG. 5 with "high" and "low" IP address usages, respectively. In the example shown in FIG. 6, eight (8) always-on mobile stations 610 are currently operating in the wireless network. Accordingly, eight (8) IP addresses of IP address pool 504 are assigned to the eight (8) mobile stations 610 as depicted in assigned address pool portion 506. On the other hand, two (2) IP addresses of IP address pool 504 are not assigned to any mobile station as depicted in unassigned address pool portion 508. Thus, the IP address usage in FIG. 6 based on the ratio of assigned IP addresses to the total number of available IP addresses is 80%. Since this is deemed to be relatively heavy traffic, the initial value obtained is relatively small (e.g. 1 hour). In the example shown in FIG. 7, only two (2) always-on mobile stations 710 are currently operating in the wireless network. Accordingly, two (2) IP addresses of IP address pool 504 are assigned to the two (2) mobile stations 710 as depicted in assigned address pool portion 506. On the other hand, eight (8) IP addresses of IP address pool 504 are not assigned to any mobile station as depicted in unassigned address pool portion 508. Thus, the IP address usage in FIG. 7 based on the ratio of assigned IP addresses to the total number of available IP addresses is 20%. Since this is deemed to be relatively light traffic, the initial value obtained is relatively large (e.g. 3 hours).

Figure 8:
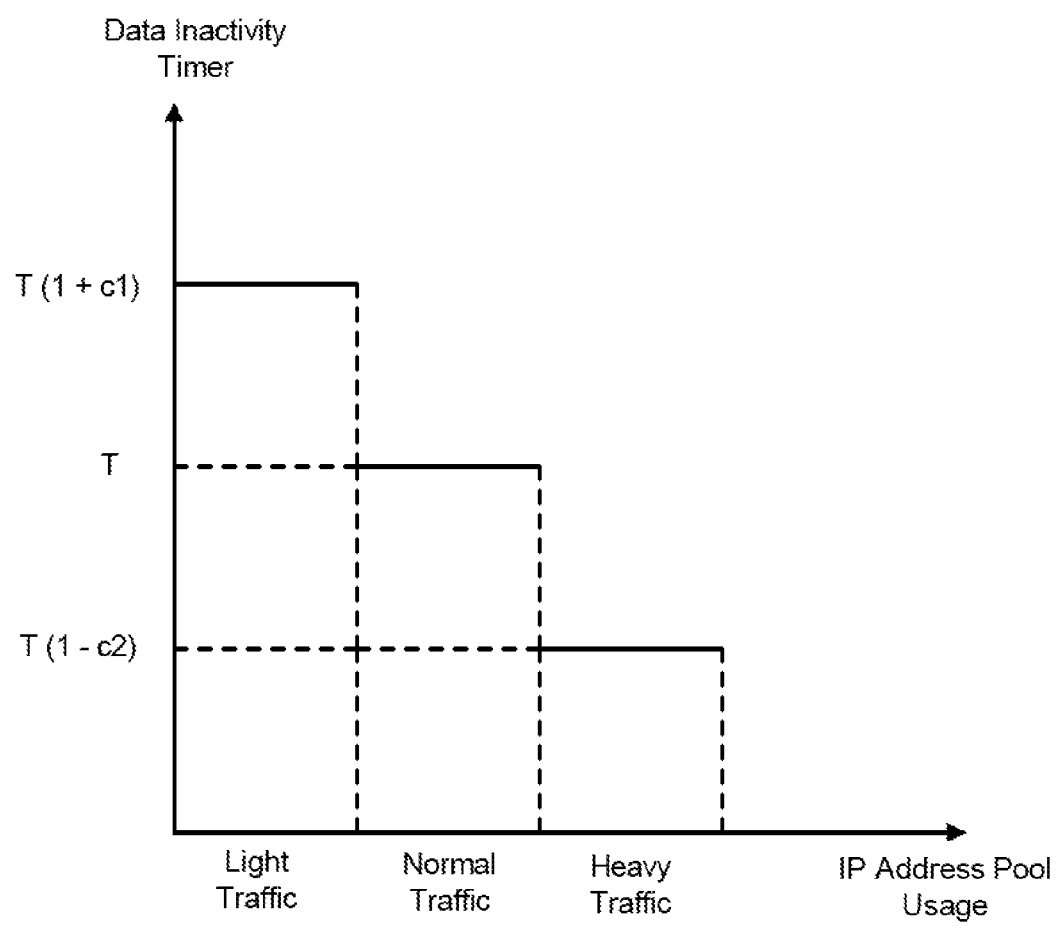
FIG. 8 is a graph which shows one specific way in which the initial value for the data inactivity timer may be related to the IP address usage.

As described earlier above, the initial value may be a continuous or discrete function of IP address usage. A more particular way of obtaining the initial value is now described. The initial value may be represented as:

Initial Value=$f(C_{IP})$ where $C_{IP}$ is IP address usage based on a ratio of assigned IP addresses to the total number of IP addresses available (0=all IP addresses available and unassigned, 1=IP address capacity limit). The function for obtaining the initial value may be expressed as:

Initial Value=$T_{const}+T_{offset}$ where $T_{const}$ is a fixed implementation-dependent constant (e.g. 2 hours) and $T_{offset}$ depends on the IP address pool usage. $T_{offset}$ is defined in Table 1 below and in a graph 802 of FIG. 8.

TABLE 1

Example of Possible Values for $T_{offset}$

| IP Pool Capacity Class | $T_{offset}$ |
|---|---|
| Light Traffic (e.g. $C_{IP} <= 0.2$) | +c1 $T_{const}$ |
| Normal Traffic (e.g. $0.2 < C_{IP} < 0.8$) | 0 |
| Heavy Traffic (e.g. $C_{IP} >= 0.8$) | −c2 $T_{const}$ |

The PDSN utilizes this function for finding the initial value of the data inactivity timer. Thus, the initial value can be obtained by executing a function of IP address usage.

As described above, IP address usage for mobile stations is identified and a data inactivity timer of a data session for a mobile station is set to an initial value that depends on the IP address usage. The data inactivity timer is utilized to terminate the data session when communication inactivity for the data session persists over a time period defined by the data inactivity timer. The data inactivity timer is set to a relatively large value when the IP address usage is low, but to a relatively small value when the IP address usage is high in order to expeditiously release underutilized network resources. The data inactivity timer is run during time periods of communication inactivity in the data session, but is reset to the initial value for occurrences of communication activity in the data session. The data session may be a Point-to-Point Protocol (PPP) session for which an IP address is dynamically-assigned to the mobile station. If the data inactivity timer expires, an Echo-Request message is sent to the mobile station. If no Echo-Reply message is received from the mobile station in response to the Echo-Request message, the data session is terminated and the dynamically-assigned IP address of the mobile station is deassigned and made available for assignment to other mobile stations.

The above-techniques may also be applied to a Mobile IP (MIP) Registration Lifetime. To explain, mobile IP provides a mechanism which allows a mobile station to change its point of attachment to the Internet without changing its IP address. A Home Agent (HA) and Foreign Agent (FA) are two routers that are utilized to manage such IP mobility. The mobile station keeps both a home IP address as well as a Care-of Address (COA) while it is away from its home network. The mobile station receives its COA during an Agent Discovery procedure when attached to a wireless network other than its home network. The mobile station registers the COA with the Home Agent through an Agent Advertisement procedure. Data packets sent to the home IP address of the mobile station are thereafter intercepted by the Home Agent, tunneled by the Home Agent to the COA of the mobile station, received at the tunnel endpoint (i.e. the Foreign Agent), and finally delivered to the mobile station.

The Registration Lifetime is the longest duration of time that the Foreign Agent is willing to accept any registration request from the mobile station. The Foreign Agent communicates the Registration Lifetime to the mobile station during the Agent Discovery procedure using an Agent Advertisement message. Upon expiration of the Registration Lifetime, the mobile station sends an MIP re-registration message to the network. The PDSN sends a LCP Terminate-Request to the mobile station if no re-registration is received upon expiration of the Registration Lifetime.

Using techniques of the present application, the wireless network may be operative to increase or decrease the initial value of the MIP Registration Lifetime based on network traffic as described above. Using such techniques, the network detects unreachable mobile stations more expeditiously using a reduced Registration Lifetime so that IP address pool space is freed up during heavy traffic conditions. Conversely, during light traffic conditions, an increased Registration Lifetime eliminates unnecessary MIP registration messages in order to save battery life of the mobile station and network capacity. Note that the MIP Registration Lifetime in the Agent Advertisement should be smaller than the value for the data inactivity timer in use for the underlying PPP session.

Methods and apparatus for controlling wireless network resources for data sessions have been described. One illustrative method involves the steps of identifying IP address usage for mobile stations operating in a wireless communication network and causing a data inactivity timer of a data session for a mobile station to be set to an initial value that depends on the IP address usage. The data inactivity timer is set to a relatively large value when the IP address usage is low, but to a relatively small value when the IP address usage is high in order to expeditiously release underutilized network resources. The data session may be Point-to-Point Protocol (PPP) session for which an IP address is dynamically-assigned to the mobile station. The method may include the further steps of running the data inactivity timer during time periods of communication inactivity in the data session for the mobile station having an IP address dynamically-assigned thereto; resetting the data inactivity timer to the initial value for occurrences of communication activity in the data session; and if the data inactivity timer expires: causing a message to be sent to the mobile station and, if no reply message is received from the mobile station in response to the message, then causing the data session to be terminated and the dynamically-assigned IP address of the mobile station to be deassigned and made available for assignment to another mobile station. The method may involve the further step of obtaining an initial value by executing a function of the IP address usage. The act of identifying the IP address usage may involve the further acts of identifying a number of assigned or unassigned IP addresses; and comparing the number of assigned or unassigned IP addresses with a threshold value. Alternatively, the act of identifying the IP address usage may involve the further acts of identifying a ratio or percentage of assigned or unassigned IP addresses to a total number of IP addresses; and comparing the ratio or percentage to a threshold value.

A more specific method of controlling wireless network resources for Point-to-Point Protocol (PPP) sessions involves the steps of identifying IP address usage for mobile stations which operate in a wireless communication network; and causing a data inactivity timer of the PPP session for a mobile station to be set to one of a first initial value based on a first IP address usage and a second initial value based on a second IP address usage, where the second IP address usage is greater than the first IP address usage and the second initial value is less than the first initial value, and where the data inactivity timer is utilized to terminate the PPP session when data inactivity for the PPP session persists over a time period defined by the data inactivity timer.

A wireless network component of the present application may include a processor; memory; computer instructions stored in the memory; where the computer instructions are executable by the processor for controlling wireless network resources for data sessions by the described method(s). The wireless network component may be part of or at the PDSN. A computer program product of the present application may include a storage medium; computer instructions stored in the storage medium; where the computer instructions are executable by a processor for controlling wireless network resources for data sessions by the described method(s).

One specific related method of controlling wireless network resources for communications includes the acts of identifying IP address usage for mobile stations which operate in a wireless communication network; and causing a registration lifetime timer for a mobile station to be set to an initial value that depends on the IP address usage. The registration lifetime timer is utilized to terminate a data session for the mobile station after its expiration. The registration lifetime timer is set to one of a first initial value based on a first IP address usage and a second initial value based on a second IP address usage, such that the second IP address usage is, greater than the first IP address usage and the second initial value is less than the first initial value. This method is also implemented with computer instructions stored in memory.

The above-described embodiments of the present application are intended to be examples only. Those of skill in the art may effect alterations, modifications and variations to the particular embodiments without departing from the scope of the application. The invention described herein in the recited claims intends to cover and embrace all suitable changes in technology.

What is claimed is:

1. A method for use in controlling network resources in a wireless network for a mobile station operating for communications in a data session, the data session being associated with a data inactivity timer for terminating the data session, the method comprising:
   assigning, from a pool of IP addresses utilized in the wireless network, a temporary IP address for the mobile station in the wireless network, the mobile station having a home IP address associated with a home network;
   calculating a ratio or percentage of the number of IP addresses assigned to mobile stations in the wireless network and the total number of IP addresses in the pool;
   setting a registration duration timer value for the mobile station to an initial value that is less than the data inactivity timer of the data session and depends on the ratio or percentage of IP addresses such that, as the ratio or percentage increases, the initial value decreases;
   causing the temporary IP address and the registration duration timer value to be sent to the mobile station, wherein the mobile station is configured to register the temporary IP address with a home agent in the home network for IP mobility service, so that data packets of the data session which are addressed to the home IP address are tunneled to the temporary IP address of the mobile station in the wireless network; and
   communicating a termination request which terminates the IP mobility service when no request for re-registration is received from the mobile station upon expiration of the registration duration timer value.

2. The method of claim 1, wherein the data session comprises a Point-to-Point Protocol (PPP) session.

3. The method of claim 1, wherein the temporary IP address comprises a Care-Of Address (COA).

4. The method of claim 1, further comprising:
   wherein the registration duration timer value is communicated to the mobile station from a foreign agent via the wireless network; and
   wherein the registration duration timer value defines a duration of time that the foreign agent will accept the request for re-registration from the mobile station.

5. A network component, comprising:
   a processor;
   memory;
   computer instructions stored in the memory;
   the computer instructions being executable by the processor for controlling network resources in a wireless network for a mobile station operating for communications in a data session, the data session being associated with a data inactivity timer for terminating the data session, the computer instructions being further executable for:
   assigning, from a pool of IP addresses, a temporary IP address for the mobile station in the wireless network, the mobile station having a home IP address associated with a home network;
   calculating a ratio or percentage of the number of IP addresses assigned to mobile stations in the wireless network and the total number of IP addresses in the pool;
   setting a registration duration timer value for the mobile station to an initial value that is less than the data inactivity timer of the data session and depends on the ratio or percentage of IP addresses such that, as the ratio or percentage increases, the initial value decreases;
   causing the temporary IP address and the registration duration timer value to be sent to the mobile station, wherein the mobile station is configured to register the temporary IP address with a home agent in the home network for IP mobility service, so that data packets of the data session which are addressed to the home IP address are tunneled to the temporary IP address of the mobile station in the wireless network; and communicating a termination request which terminates the IP mobility service when no request for re-registration is received from the mobile station upon expiration of the registration duration timer value.

6. The network component of claim. 5, wherein the data session comprises a Point-to-Point Protocol (PPP) session.

7. The network component of claim 5, wherein the temporary IP address comprises a Care-Of Address (COA).

8. The network component of claim 5, wherein the computer instructions are further executable by the processor for:
setting and running the registration duration timer value; and
causing the termination request for the data session to be communicated if no request for re-registration is received from the mobile station upon expiration of the registration duration timer value.

9. The network component of claim 5, wherein the registration duration timer value is communicated to the mobile station by a foreign agent via the wireless network; and wherein the registration duration timer value defines a duration of time that the foreign agent will accept the request for re-registration from the mobile station.

10. A method for use in a mobile station for controlling network resources while operating for communications in a data session, the data session being associated with a data inactivity timer utilized for terminating the data session, the mobile station having a home IP address associated with a home network, the method comprising:
receiving, via an alternative network, assignment of a temporary IP address from a pool of IP addresses utilized in the alternative network;
receiving, via the alternative network, a registration duration timer value having an initial value that is less than the data inactivity timer of the data session and depends on a calculated ratio or percentage of the number of IP addresses assigned to mobile stations in the alternative network and the total number of IP addresses in the pool, such that as the ratio or percentage increases, the initial value decreases;
registering, via the alternative network, the temporary IP address with a home agent in the home network for IP mobility service;
receiving, via the alternative network using the IP mobility service, data packets originally addressed to the home IP address but tunneled to the temporary IP address of the mobile station in the alternative network;
for continuing the IP mobility service: prior to expiration of the registration duration timer value, communicating to the alternative network a request for re-registration; and
for terminating the IP mobility service: upon expiration of the registration duration timer value, refraining from communicating to the alternative network a request for re-registration, thereby invoking a termination request which terminates the IP mobility service.

11. The method of claim 10, wherein the data session comprises a Point-to-Point Protocol (PPP) session.

12. The method of claim 10, wherein the temporary IP address comprises a Care-Of Address (COA).

13. The method of claim 10, further comprising:
wherein the registration duration timer value is communicated to the mobile station from a foreign agent via the alternative network; and
wherein the registration duration timer value defines a duration of time that the foreign agent will accept the request for re-registration from the mobile station.

14. A mobile station, comprising:
a controller;
a wireless transceiver coupled to the controller;
the controller being configured to control network resources while the mobile station operates for communications in a data session, the data session being associated with a data inactivity tinier for terminating the data session, the mobile station having a home IP address associated with a home network, the controller being further configured to;
receive, from an alternative network via the wireless transceiver, a temporary IP address from a pool of IP addresses utilized in the alternative network;
receive, from the alternative network via the wireless transceiver, a registration duration timer value having an initial value that is less than the data inactivity timer of the data session and depends on a calculated ratio or percentage of the number of IP addresses assigned to mobile stations in the alternative network and the total number of IP addresses in the pool, such that as the ratio or percentage increases, the initial value decreases;
register, from the alternative network via the wireless transceiver, the temporary IP address with a home agent in the home network for IP mobility service;
receive, from the alternative network via the wireless transceiver, using the IP mobility service, data packets originally addressed to the home IP address but tunneled to the temporary IP address of the mobile station in the alternative network;
for continuing the IP mobility service: prior to expiration of the registration duration timer value, communicate to the alternative network via the wireless transceiver a request for re-registration; and
for terminating the IP mobility service: upon expiration of the registration duration timer value, refrain from communicating to the alternative network a request for re-registration, thereby invoking a termination request which terminates the IP mobility service.

15. The mobile station of claim 14, wherein the data session comprises a Point-to-Point Protocol (PPP) session.

16. The mobile station of claim 14, wherein the temporary IP address comprises a Care-Of Address (COA).

17. The mobile station of claim 14 wherein the registration duration timer value is communicated to the mobile station from a foreign agent via the alternative network, and the registration duration timer value defines a duration of time that the foreign agent will accept the request for re-registration from the mobile station.

* * * * *